(12) United States Patent
Murphy

(10) Patent No.: US 9,191,799 B2
(45) Date of Patent: Nov. 17, 2015

(54) SHARING DATA BETWEEN WIRELESS SWITCHES SYSTEM AND METHOD

(75) Inventor: James Murphy, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1490 days.

(21) Appl. No.: 11/595,119

(22) Filed: Nov. 10, 2006

(65) Prior Publication Data

US 2008/0114784 A1    May 15, 2008

Related U.S. Application Data

(60) Provisional application No. 60/812,403, filed on Jun. 9, 2006.

(51) Int. Cl.
*H04M 3/00* (2006.01)
*H04W 8/00* (2009.01)
(Continued)

(52) U.S. Cl.
CPC ............... *H04W 8/005* (2013.01); *H04W 8/14* (2013.01); *H04W 28/06* (2013.01); *H04W 88/08* (2013.01); *H04W 88/14* (2013.01); *H04W 92/24* (2013.01)

(58) Field of Classification Search
CPC ..... H04W 8/183; H04W 48/16; H04W 72/04; H04W 84/08; H04W 84/18; H04W 84/12; H04L 29/06; G06F 17/30286
USPC .............. 455/432.1, 515, 450, 509, 418, 436, 455/439, 446, 522, 435.2, 456.1; 370/310, 370/338, 401, 328, 432, 449, 466, 342, 441, 370/331, 389; 707/E17.044, 100; 709/227
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |

(Continued)

FOREIGN PATENT DOCUMENTS

| | | |
|---|---|---|
| EP | 0 992 921 A2 | 4/2000 |
| EP | 1 542 409 A | 6/2005 |

(Continued)

OTHER PUBLICATIONS

U.S. App. No. 11/326,966, filed Jan. 2006, Taylor.
(Continued)

*Primary Examiner* — Charles Appiah
*Assistant Examiner* — Alexander Yi

(57) ABSTRACT

A technique for facilitating the management of a wireless database related to station records and radio-frequency (RF) information by reducing unnecessary sharing of the data among wireless switches, thus enhancing efficiency in a wireless network. A system constructed according to the technique includes a collection of wireless switches with each switch having associated access points (AP), an AP database distributed throughout the collection of wireless switches, and at least one station radio frequency (RF) database. The AP database includes data associated with ownership of the AP's by the switches, and the station RF database includes wireless station information and RF information. AP radio adjacency is determined by whether an AP owned by a specific switch can detect the other AP owned by another switch. The station and RF information database is shared only within the subset of switches that have AP radio adjacency.

11 Claims, 8 Drawing Sheets

(51) Int. Cl.
  *H04W 8/14* (2009.01)
  *H04W 28/06* (2009.01)
  *H04W 88/08* (2009.01)
  *H04W 88/14* (2009.01)
  *H04W 92/24* (2009.01)

(56) References Cited

U.S. PATENT DOCUMENTS

| | | |
|---|---|---|
| 4,176,316 A | 11/1979 | DeRosa et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,444,851 A | 8/1995 | Woest |
| 5,448,569 A | 9/1995 | Huang et al. |
| 5,450,615 A | 9/1995 | Fortune et al. .................. 9/95 |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek .................. 2/96 |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright |
| 6,088,591 A | 7/2000 | Trompower |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Birukawa et al. .................. 2/1 |
| 6,199,032 B1 | 3/2001 | Anderson |
| 6,208,629 B1 | 3/2001 | Jaszewski et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright et al. |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |

(56) References Cited

U.S. PATENT DOCUMENTS

| | | |
|---|---|---|
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watanabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. ............ 1/2 |
| 6,347,091 B1 | 2/2002 | Wallentin et al. |
| 6,356,758 B1 | 3/2002 | Almeida et al. |
| 6,393,290 B1 | 5/2002 | Ulfongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,574,240 B1 | 6/2003 | Tzeng |
| 6,580,700 B1 | 6/2003 | Pinard et al. |
| 6,587,680 B1 | 7/2003 | Ata-Laurila et al. ............ 7/3 |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,725,260 B1 | 4/2004 | Philyaw |
| 6,738,629 B1 | 5/2004 | McCormick et al. |
| 6,747,961 B1 | 6/2004 | Ahmed et al. |
| 6,756,940 B2 | 6/2004 | Oh et al. |
| 6,760,324 B1 | 7/2004 | Scott et al. |
| 6,785,275 B1 | 8/2004 | Boivie et al. |
| 6,798,788 B1 | 9/2004 | Viswanath et al. |
| 6,801,782 B2 | 10/2004 | McCrady et al. |
| 6,826,399 B1 | 11/2004 | Hoffman et al. |
| 6,839,338 B1 | 1/2005 | Amara et al. ............ 1/5 |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 | 2/2005 | Henry et al. |
| 6,879,812 B2 | 4/2005 | Agrawal et al. |
| 6,901,439 B1 | 5/2005 | Bonasia et al. |
| 6,917,688 B2 | 7/2005 | Yu et al. |
| 6,934,260 B1 | 8/2005 | Kanuri |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B2 | 1/2006 | Leung |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. ............ 3/6 |
| 7,024,199 B1 | 4/2006 | Massie et al. |
| 7,024,394 B1 | 4/2006 | Ashour et al. |
| 7,027,773 B1 | 4/2006 | McMillin |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. ............ 6/6 |
| 7,068,999 B2 | 6/2006 | Ballai |
| 7,079,537 B1 | 7/2006 | Kanuri et al. |
| 7,089,322 B1 | 8/2006 | Stallmann |
| 7,092,529 B2 | 8/2006 | Yu et al. |
| 7,110,756 B2 | 9/2006 | Diener ............ 9/6 |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B1 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow ............ 12/6 |
| 7,158,777 B2 | 1/2007 | Lee et al. |
| 7,159,016 B2 | 1/2007 | Baker |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 | 5/2008 | Caves et al. |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,443,823 B2 | 10/2008 | Hunkeler et al. |
| 7,447,502 B2 | 11/2008 | Buckley et al. |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 | 1/2009 | Sinha |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |
| 7,592,906 B1 | 9/2009 | Hanna et al. |
| 7,636,363 B2 | 12/2009 | Chang et al. |
| 7,680,501 B2 | 3/2010 | Sillasto et al. |
| 7,693,526 B2 | 4/2010 | Qian et al. |
| 7,715,432 B2 | 5/2010 | Bennett |

(56) References Cited

U.S. PATENT DOCUMENTS

| | | | |
|---|---|---|---|
| 7,716,379 B2 | 5/2010 | Ruan et al. | |
| 7,724,703 B2 | 5/2010 | Matta et al. | |
| 7,724,704 B2 | 5/2010 | Simons et al. | |
| 7,729,278 B2 | 6/2010 | Chari et al. | |
| 7,733,868 B2 | 6/2010 | Van Zijst | |
| 7,746,897 B2 | 6/2010 | Stephenson et al. | |
| 7,788,475 B2 | 8/2010 | Zimmer et al. | |
| 7,805,529 B2 | 9/2010 | Galluzzo et al. | |
| 7,817,554 B2 | 10/2010 | Skog et al. | |
| 7,844,298 B2 | 11/2010 | Riley | |
| 7,865,713 B2 | 1/2011 | Chesnutt et al. | |
| 7,873,061 B2 | 1/2011 | Gast et al. | |
| 7,894,852 B2 | 2/2011 | Hansen | |
| 7,912,982 B2 | 3/2011 | Murphy | |
| 7,929,922 B2 | 4/2011 | Kubo | |
| 7,945,399 B2 | 5/2011 | Nosovitsky et al. | |
| 7,986,940 B2 | 7/2011 | Lee et al. | |
| 2001/0024953 A1 | 9/2001 | Balogh | |
| 2002/0021701 A1 | 2/2002 | Lavian et al. | |
| 2002/0052205 A1 | 5/2002 | Belostotsky et al. | |
| 2002/0060995 A1 | 5/2002 | Cervello et al. | |
| 2002/0062384 A1 | 5/2002 | Tso | |
| 2002/0069278 A1 | 6/2002 | Forslow | |
| 2002/0078361 A1 | 6/2002 | Giroux et al. | |
| 2002/0080790 A1 | 6/2002 | Beshai | |
| 2002/0087699 A1 | 7/2002 | Karagiannis et al. | |
| 2002/0094824 A1 | 7/2002 | Kennedy et al. | |
| 2002/0095486 A1 | 7/2002 | Bahl | |
| 2002/0101868 A1 | 8/2002 | Clear et al. | |
| 2002/0116655 A1 | 8/2002 | Lew et al. | |
| 2002/0157020 A1 | 10/2002 | Royer | |
| 2002/0174137 A1 | 11/2002 | Wolff et al. | |
| 2002/0176437 A1 | 11/2002 | Busch et al. | |
| 2002/0191572 A1 | 12/2002 | Weinstein et al. | |
| 2002/0194251 A1 | 12/2002 | Richter et al. | |
| 2003/0014646 A1 | 1/2003 | Buddhikot et al. | |
| 2003/0018889 A1 | 1/2003 | Burnett et al. | |
| 2003/0043073 A1 | 3/2003 | Gray et al. | |
| 2003/0055959 A1 | 3/2003 | Sato | |
| 2003/0107590 A1 | 6/2003 | Levillain et al. | |
| 2003/0120764 A1 | 6/2003 | Laye et al. | |
| 2003/0133450 A1 | 7/2003 | Baum | |
| 2003/0134642 A1 | 7/2003 | Kostic et al. | |
| 2003/0135762 A1 | 7/2003 | Macaulay | |
| 2003/0156586 A1 | 8/2003 | Lee et al. | |
| 2003/0174706 A1 | 9/2003 | Shankar et al. | |
| 2003/0193910 A1 | 10/2003 | Shoaib et al. | |
| 2003/0204596 A1 | 10/2003 | Yadav | |
| 2003/0227934 A1 | 12/2003 | White et al. | |
| 2004/0002343 A1 | 1/2004 | Brauel et al. | |
| 2004/0003285 A1 | 1/2004 | Whelan et al. | |
| 2004/0019857 A1 | 1/2004 | Teig et al. | |
| 2004/0025044 A1 | 2/2004 | Day | |
| 2004/0029580 A1 | 2/2004 | Haverinen et al. | |
| 2004/0030777 A1 | 2/2004 | Reedy et al. | |
| 2004/0038687 A1 | 2/2004 | Nelson | |
| 2004/0044749 A1 | 3/2004 | Harkin | |
| 2004/0047320 A1 | 3/2004 | Eglin | |
| 2004/0053632 A1* | 3/2004 | Nikkelen et al. | 455/522 |
| 2004/0054569 A1 | 3/2004 | Pombo et al. | |
| 2004/0054774 A1 | 3/2004 | Barber et al. | |
| 2004/0054926 A1 | 3/2004 | Ocepek et al. | |
| 2004/0062267 A1 | 4/2004 | Minami et al. | |
| 2004/0064560 A1 | 4/2004 | Zhang et al. | |
| 2004/0068668 A1* | 4/2004 | Lor et al. | 713/201 |
| 2004/0072587 A1* | 4/2004 | Tari et al. | 455/515 |
| 2004/0078598 A1 | 4/2004 | Barber et al. | |
| 2004/0093506 A1 | 5/2004 | Grawrock et al. | |
| 2004/0095914 A1 | 5/2004 | Katsube et al. | |
| 2004/0095932 A1 | 5/2004 | Astarabadi et al. | |
| 2004/0106403 A1 | 6/2004 | Mori et al. | |
| 2004/0111640 A1 | 6/2004 | Baum | |
| 2004/0114546 A1 | 6/2004 | Seshadri et al. | |
| 2004/0119641 A1 | 6/2004 | Rapeli | |
| 2004/0120370 A1 | 6/2004 | Lupo | |
| 2004/0143428 A1 | 7/2004 | Rappaport et al. | |
| 2004/0165545 A1 | 8/2004 | Cook | |
| 2004/0174900 A1 | 9/2004 | Volpi et al. | |
| 2004/0184475 A1 | 9/2004 | Meier | |
| 2004/0208570 A1 | 10/2004 | Reader | |
| 2004/0214572 A1 | 10/2004 | Thompson et al. | |
| 2004/0221042 A1 | 11/2004 | Meier | |
| 2004/0230370 A1 | 11/2004 | Tzamaloukas | |
| 2004/0233234 A1 | 11/2004 | Chaudhry et al. | |
| 2004/0236702 A1 | 11/2004 | Fink et al. | |
| 2004/0246937 A1 | 12/2004 | Duong et al. | |
| 2004/0246962 A1 | 12/2004 | Kopeikin et al. | |
| 2004/0252656 A1 | 12/2004 | Shiu et al. | |
| 2004/0255167 A1 | 12/2004 | Knight | |
| 2004/0259542 A1 | 12/2004 | Viitamaki et al. | |
| 2004/0259555 A1 | 12/2004 | Rappaport et al. | |
| 2004/0259575 A1 | 12/2004 | Perez-Breva et al. | |
| 2005/0015592 A1 | 1/2005 | Lin | |
| 2005/0021979 A1 | 1/2005 | Wiedmann et al. | |
| 2005/0025105 A1 | 2/2005 | Rue | |
| 2005/0026611 A1 | 2/2005 | Backes | |
| 2005/0030894 A1 | 2/2005 | Stephens | |
| 2005/0030929 A1 | 2/2005 | Swier et al. | |
| 2005/0037818 A1 | 2/2005 | Seshadri et al. | |
| 2005/0040968 A1 | 2/2005 | Damarla et al. | |
| 2005/0054326 A1 | 3/2005 | Rogers | |
| 2005/0054350 A1 | 3/2005 | Zegelin | |
| 2005/0058132 A1 | 3/2005 | Okano et al. | |
| 2005/0059405 A1 | 3/2005 | Thomson et al. | |
| 2005/0059406 A1* | 3/2005 | Thomson et al. | 455/446 |
| 2005/0064873 A1 | 3/2005 | Karaoguz et al. | |
| 2005/0068925 A1 | 3/2005 | Palm et al. | |
| 2005/0073980 A1 | 4/2005 | Thomson et al. | |
| 2005/0078644 A1 | 4/2005 | Tsai et al. | |
| 2005/0097618 A1 | 5/2005 | Arling et al. | |
| 2005/0114649 A1 | 5/2005 | Challener et al. | |
| 2005/0120125 A1 | 6/2005 | Morten et al. | |
| 2005/0122927 A1 | 6/2005 | Wentink | |
| 2005/0122977 A1 | 6/2005 | Lieberman | |
| 2005/0128142 A1 | 6/2005 | Shin et al. | |
| 2005/0128989 A1 | 6/2005 | Bhagwat et al. | 6/5 |
| 2005/0144237 A1 | 6/2005 | Heredia et al. | |
| 2005/0154933 A1 | 7/2005 | Hsu et al. | |
| 2005/0157730 A1 | 7/2005 | Grant et al. | 7/5 |
| 2005/0159154 A1 | 7/2005 | Goren | |
| 2005/0163078 A1 | 7/2005 | Oba et al. | |
| 2005/0163146 A1 | 7/2005 | Ota et al. | |
| 2005/0175027 A1 | 8/2005 | Miller et al. | |
| 2005/0180345 A1 | 8/2005 | Meier | |
| 2005/0180358 A1 | 8/2005 | Kolar et al. | |
| 2005/0181805 A1 | 8/2005 | Gallagher | 8/5 |
| 2005/0190714 A1 | 9/2005 | Gorbatov et al. | |
| 2005/0193103 A1 | 9/2005 | Drabik | |
| 2005/0207336 A1 | 9/2005 | Choi et al. | |
| 2005/0213519 A1 | 9/2005 | Relan et al. | |
| 2005/0220033 A1 | 10/2005 | DelRegno et al. | |
| 2005/0223111 A1 | 10/2005 | Bhandaru et al. | 10/5 |
| 2005/0239461 A1 | 10/2005 | Verma et al. | |
| 2005/0240665 A1 | 10/2005 | Gu et al. | 10/5 |
| 2005/0243737 A1 | 11/2005 | Dooley et al. | |
| 2005/0245258 A1 | 11/2005 | Classon et al. | |
| 2005/0245269 A1 | 11/2005 | Demirhan et al. | |
| 2005/0259597 A1 | 11/2005 | Benedetotto et al. | 11/5 |
| 2005/0259611 A1 | 11/2005 | Bhagwat et al. | |
| 2005/0270992 A1 | 12/2005 | Sanzgiri et al. | |
| 2005/0273442 A1 | 12/2005 | Bennett | |
| 2005/0276218 A1 | 12/2005 | Ooghe et al. | 12/5 |
| 2005/0286466 A1 | 12/2005 | Tagg et al. | |
| 2006/0030290 A1 | 2/2006 | Rudolf et al. | |
| 2006/0035662 A1 | 2/2006 | Jeong et al. | |
| 2006/0039395 A1 | 2/2006 | Perez-Costa et al. | |
| 2006/0041683 A1 | 2/2006 | Subramanian et al. | |
| 2006/0045050 A1 | 3/2006 | Floros et al. | 3/6 |
| 2006/0046744 A1 | 3/2006 | Dublish et al. | |
| 2006/0050742 A1 | 3/2006 | Grandhi et al. | |
| 2006/0073847 A1 | 4/2006 | Pirzada et al. | |
| 2006/0094440 A1 | 5/2006 | Meier et al. | |
| 2006/0098607 A1 | 5/2006 | Zeng et al. | |
| 2006/0104224 A1 | 5/2006 | Singh et al. | |

(56) References Cited

U.S. PATENT DOCUMENTS

| | | |
|---|---|---|
| 2006/0114872 A1 | 6/2006 | Hamada |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0174336 A1 | 8/2006 | Chen |
| 2006/0178168 A1 | 8/2006 | Roach |
| 2006/0182118 A1 | 8/2006 | Lam et al. |
| 2006/0189311 A1 | 8/2006 | Cromer et al. |
| 2006/0193258 A1 | 8/2006 | Ballai |
| 2006/0200862 A1 | 9/2006 | Olson et al. |
| 2006/0206582 A1 | 9/2006 | Finn |
| 2006/0215601 A1 | 9/2006 | Vieugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1* | 11/2006 | Harkins ............ 713/155 |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0008884 A1 | 1/2007 | Tang |
| 2007/0011318 A1 | 1/2007 | Roth |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0054616 A1 | 3/2007 | Culbert |
| 2007/0058598 A1* | 3/2007 | Ling ............ 370/338 |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0083924 A1 | 4/2007 | Lu |
| 2007/0086378 A1 | 4/2007 | Matta et al. |
| 2007/0086397 A1 | 4/2007 | Tiwari |
| 2007/0086398 A1 | 4/2007 | Tiwari |
| 2007/0091845 A1 | 4/2007 | Brideglall |
| 2007/0091889 A1 | 4/2007 | Xiao et al. |
| 2007/0098086 A1 | 5/2007 | Bhaskaran |
| 2007/0104197 A1 | 5/2007 | King |
| 2007/0115842 A1 | 5/2007 | Matsuda et al. |
| 2007/0133494 A1 | 6/2007 | Lai et al. |
| 2007/0135866 A1 | 6/2007 | Baker et al. |
| 2007/0136372 A1 | 6/2007 | Proctor et al. |
| 2007/0160046 A1 | 7/2007 | Matta |
| 2007/0171909 A1 | 7/2007 | Pignatelli |
| 2007/0183375 A1 | 8/2007 | Tiwari |
| 2007/0189222 A1 | 8/2007 | Kolar et al. |
| 2007/0195793 A1 | 8/2007 | Grosser et al. |
| 2007/0230457 A1 | 10/2007 | Kodera et al. |
| 2007/0248009 A1 | 10/2007 | Petersen |
| 2007/0253380 A1 | 11/2007 | Jollota et al. |
| 2007/0255116 A1 | 11/2007 | Mehta et al. |
| 2007/0258448 A1 | 11/2007 | Hu |
| 2007/0260720 A1 | 11/2007 | Morain |
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1 | 12/2007 | Kanada et al. |
| 2007/0287390 A1 | 12/2007 | Murphy et al. |
| 2007/0291689 A1 | 12/2007 | Kapur et al. |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0013481 A1 | 1/2008 | Simons et al. |
| 2008/0014916 A1 | 1/2008 | Chen |
| 2008/0031257 A1 | 2/2008 | He |
| 2008/0056200 A1 | 3/2008 | Johnson |
| 2008/0056211 A1 | 3/2008 | Kim et al. |
| 2008/0064356 A1 | 3/2008 | Khayrallah |
| 2008/0069018 A1 | 3/2008 | Gast |
| 2008/0080441 A1 | 4/2008 | Park et al. |
| 2008/0096575 A1 | 4/2008 | Aragon et al. |
| 2008/0102815 A1 | 5/2008 | Sengupta et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0151844 A1 | 6/2008 | Tiwari |
| 2008/0159319 A1 | 7/2008 | Gast et al. |
| 2008/0162921 A1 | 7/2008 | Chesnutt et al. |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1 | 10/2008 | Namihira |
| 2008/0261615 A1 | 10/2008 | Kalhan |
| 2008/0276303 A1 | 11/2008 | Gast |
| 2009/0031044 A1 | 1/2009 | Barrack et al. |
| 2009/0046688 A1 | 2/2009 | Volpi et al. |
| 2009/0059930 A1 | 3/2009 | Ryan et al. |
| 2009/0067436 A1 | 3/2009 | Gast |
| 2009/0073905 A1 | 3/2009 | Gast |
| 2009/0131082 A1 | 5/2009 | Gast |
| 2009/0198999 A1 | 8/2009 | Harkins |
| 2009/0247103 A1 | 10/2009 | Aragon |
| 2009/0257437 A1 | 10/2009 | Tiwari |
| 2009/0260083 A1 | 10/2009 | Szeto et al. |
| 2009/0274060 A1 | 11/2009 | Taylor |
| 2009/0287816 A1 | 11/2009 | Matta et al. |
| 2009/0293106 A1 | 11/2009 | Peden, II et al. |
| 2010/0002610 A1 | 1/2010 | Bowser et al. |
| 2010/0024007 A1 | 1/2010 | Gast |
| 2010/0040059 A1 | 2/2010 | Hu |
| 2010/0067379 A1 | 3/2010 | Zhao et al. |
| 2010/0172276 A1 | 7/2010 | Aragon |
| 2010/0180016 A1 | 7/2010 | Bugwadia et al. |
| 2010/0195549 A1 | 8/2010 | Aragon et al. |
| 2010/0261475 A1 | 10/2010 | Kim et al. |
| 2010/0329177 A1 | 12/2010 | Murphy et al. |
| 2011/0128858 A1 | 6/2011 | Matta et al. |
| 2011/0158122 A1 | 6/2011 | Murphy et al. |
| 2011/0255466 A1 | 10/2011 | Gast et al. |

FOREIGN PATENT DOCUMENTS

| | | |
|---|---|---|
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO94/03986 | 2/1994 |
| WO | WO99/11003 | 3/1999 |
| WO | WO 00/06271 A1 | 2/2000 |
| WO | WO 00/18148 | 3/2000 |
| WO | WO 02/089442 A1 | 11/2002 |
| WO | WO 03/085544 A1 | 10/2003 |
| WO | WO 2004/013986 A1 | 2/2004 |
| WO | WO 2004/095192 A2 | 11/2004 |
| WO | WO 2004/095800 A1 | 11/2004 |

OTHER PUBLICATIONS

U.S. Appl. No. 11/330,877, filed Jan. 2006, Matta.
U.S. Appl. No. 11/331,789, filed Jan. 2006, Matta, et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
U.S. Appl. No. 11/588,848, filed Oct. 2006, Zeldin et al.

(56) References Cited

OTHER PUBLICATIONS

U.S. Appl. No. 11/588,849, filed Oct. 2006, Zeldin et al.
U.S. Appl. No. 11/588,878, filed Oct. 2006, Zeldin et al.
U.S. Appl. No. 11/592,891, filed Nov. 2006, Zeldin et al.
U.S. Appl. No. 11/604,075, filed Nov. 2006, Murphy et al.
Acampora and Winters, IEEE Communications Magazine, 25(8):11-20 (1987).
Acampora and Winters, IEEE Journal on selected Areas in Communications. *SAC*-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
U.S. Appl. No. 11/595,119, filed Nov. 2006, Murphy, James.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Puttini, R., Percher, J., Me, L., and de Sousa, R. 2004. A fully distributed IDS for MANET. In *Proceedings of the Ninth international Symposium on Computers and Communications* 2004 vol. 2 (Iscc"04)—vol. 02 (Jun. 28 -Jul. 1, 2004). ISCC. IEEE Computer Society, Washington, DC, 331-338.
Puttini, R., Percher, J., Me, L., and De Sousa, R. 2004. A fully distributed IDS for MANET. In *Proceedings of the Ninth international Symposium on Computers and Communications* 2004 vol. 2 (Iscc"04)—vol. 02 (Jun. 28-Jul. 1, 2004). ISCC. IEEE Computer Society. Washinaton. DC. 331-338.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).
P. Bahl et al., Radar: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A Data Fusion Architecture for Enhanced Position Estimation in Wireless Networks," IEEE Communications Letters , vol. 5(8), Aug. 2001, p. 343-345.
Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doe.: IEEE 802.11-08/0759r0, 14 pages.
3COM, Wireless LAN Mobility System: Wireless LAN Switch and Controller Configuration Guide, 3COM, Revision A, Oct. 2004, 476 pages.
3COM, Wireless LAN Switch Manager (3WXM), 3COM, Revision C, Oct. 2004, 8 pages.
3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Johnson, David B, et al., "DSR The Dynamic Source Routing Protocol for Multi-Hop Wireless Ad Hoc Networks," Computer Science

(56) References Cited

OTHER PUBLICATIONS

Department, Carnegie Mellon University, Nov. 3, 2005 (http://monarch.cs.rice.edu/monarch-papers/dsr-chapter00.pdf).
Information Sciences Institute, RFC-791—Internet Protocol, DARPA, Sep. 1981.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 12/603,391, filed Oct. 21, 2009.
U.S. Appl. No. 12/763,057, filed Apr. 19, 2010.
U.S. Appl. No. 09/866,474, filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.

(56) References Cited

OTHER PUBLICATIONS

International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.

\* cited by examiner

SHARING DATA BETWEEN WIRELESS SWITCHES SYSTEM AND METHOD

CROSS REFERENCE TO RELATED APPLICATIONS

This application claims priority to U.S. Provisional Patent Application No. 60/812,403, filed Jun. 9, 2006, and entitled WIRELESS NETWORK ARCHITECTURE; which application is hereby incorporated by reference.

BACKGROUND

A wireless network typically includes a number of wireless switches, and each of the switches typically includes multiple access points (APs) that couple wireless stations to the respective switches. Typically, a station will be within range of only a subset of the APs. However, since the station can roam to potentially any other AP associated with the wireless network, the wireless switches must share information about the station, and indeed all of the wireless stations and radio frequency (RF) data throughout the wireless network.

The sharing of data between all of the switches is not a problem for relatively small wireless networks. However, as the size of the wireless network grows, the number of switches also grows accordingly, as does the size of the database storing station and RF data. This may result in a scaling problem as the size of the database increases, which may translate into increased maintenance costs, network costs, and latency.

These are but a subset of the problems and issues associated with sharing data between wireless switches, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for facilitating the management of a wireless database related to station records and radio-frequency (RF) information by reducing unnecessary sharing of the data among wireless switches enhances efficiency in a wireless network. A system constructed according to the technique includes a collection of wireless switches with each switch having one or more associated access points (AP). The system further includes at least one wireless database. The system may further include an AP database distributed throughout the collection of wireless switches. The AP database includes data associated with ownership of the AP's by the switches, and the wireless data database includes, for example, wireless station information and RF information. AP radio adjacency is determined by whether an AP owned by a specific switch can detect an AP owned by another switch. The station and RF information database is shared only within the subset of switches that have AP radio adjacency.

The proposed system can offer, among other advantages, relatively small databases for use when sharing data between wireless switches. This and other advantages of the techniques described herein will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
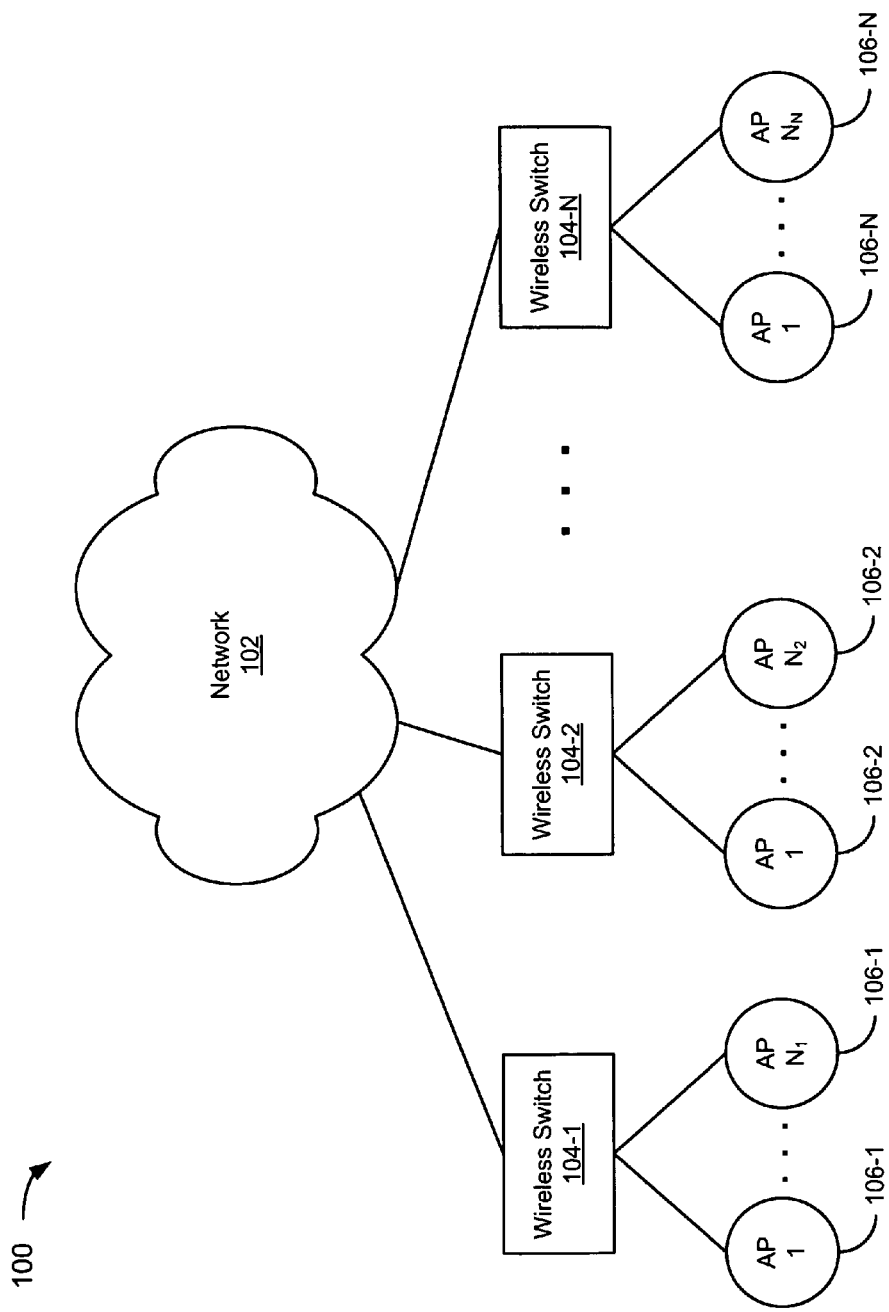
FIG. 1 depicts an example of a network with multiple wireless switches.

FIG. 1 depicts an example of a system 100 with multiple wireless switches. In the example of FIG. 1, the system 100 includes a network 102, wireless switches 104-1 to 104-N (collectively referred to as the wireless switches 104), and access points (APs) 106-1 to 106-N (collectively referred to as the respective APs 106). For illustrative purposes only, there are $N_1$ APs 106-1, $N_2$ APs 106-2, and $N_N$ APs 106-N. However, even one AP would be sufficient for a switch to couple a station (not shown) to the network 102.

The network 102 may include an Internet protocol (IP) network. In an embodiment, the network 102 is a wired backbone to which the wireless switches 104 are coupled. However, the network 102 may alternatively represent the network, or any other network, to which a backbone network is coupled. Thus, the network 102 could include, for example, the Internet.

The wireless switches 104 are typically wire connected to the respective APs 106. Thus, the "wireless" switch should be thought of as a switch for wireless traffic. The wireless switches 104 themselves are not wirelessly connected to anything. An AP and a wireless switch could be combined into a single device. However, in this description, the functionality of an AP is differentiated from the functionality of a switch by acting as if the APs and the wireless switches are distinct devices.

In the example of FIG. 1, each of the wireless switches 104 is associated with the respective APs 106, and the wireless switches 104 control the respective APs 106. In an embodiment, the respective APs 106 include radio transmitters and receivers (transceivers) that are used to provide wireless network connectivity for users and client access to the functions of the wireless switches 104. Within an IEEE 802.11 context, a station is any IEEE 802.11 entity or the equivalent in other related standards, and it may be roaming or stationary.

It will be appreciated in light of the description provided herein that although aspects of the invention are described relative to IEEE 802.11 standards, and that certain embodiments have particular features that are implemented within the 802.11 context, the invention itself is not limited to 802.11 networks and may generally be applied to any wireless network; and to the extent that future technological enhancements might obscure the distinctions between wireless switches, APs, and/or stations, the invention is understood to include components providing the features of such switches, access points, and stations independently of how they are packaged, combined, or labeled.

Wireless data may include, by way of example but not limitation, station association data and RF environment data. The station and RF data is used by the wireless switches 104 to support features including roaming, auto channel selection, rogue AP detection, intrusion detection and the launching of countermeasures. A wireless switch of the wireless switches 104 shares wireless data with a subset of the wireless switches 104. Specifically, the wireless switch shares information with those switches that have respective APs 106 with radio adjacency.

Figure 2:
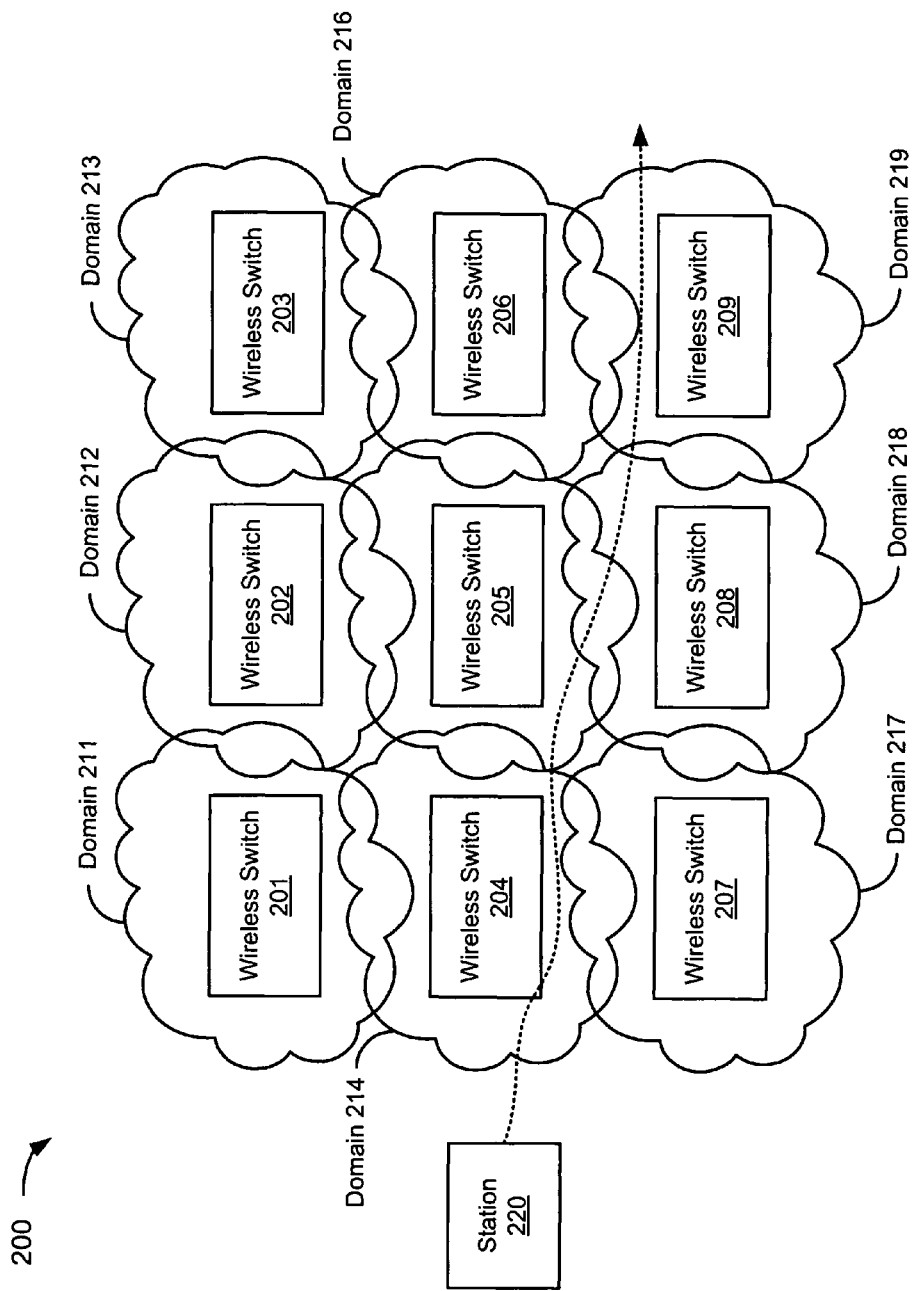
FIG. 2 depicts an example of a system with contiguous radio domains.

FIG. 2 depicts an example of a system 200 with contiguous radio domains. In the example of FIG. 2, the system 200 includes switches 201-209, domains 211-219, and a station 220. (It may be noted that the domain 215 has not been labeled with a reference numeral because it is difficult to fit in the figure, but since the domains 211-214, 216-219 have been labeled, the figure is clear.)

In the example of FIG. 2, the domains 211-219 are switch-specific in that each domain has within it a particular wireless switch (e.g., domain 211 includes the wireless switch 201, domain 212 includes the wireless switch 202, etc.). In an alternative, there may be multiple switches per domain. A radio service space is a switch-specific domain in which the switch has sufficient RF signal strength to communicate with an entity in the domain. Thus, if the station 220 roams into the domain 214, APs associated with the switch 204 should be able to communicate with the station 220.

The domains 211-219 may be part of a global radio domain (not shown), that may include other domains (not shown). Thus, the domains 211-219 may be thought of as a subset of the global radio domain. The global radio domain need not be contiguous, but in practice it is likely to be so.

In the example of FIG. 2, the domain 214 is a contiguous with the domains 211, 215, and 217 (because the radio coverage of the domain 214 overlaps with that of the domains 211, 215, and 217). A contiguous radio domain is an area where there is uninterrupted (or substantially uninterrupted) radio connectivity. Thus, the domains 211, 214, 215, and 217 may be referred to as a contiguous radio domain. Since, in the example of FIG. 2, the domains 211-219 are switch-specific, the contiguous radio domain that includes the domains 211, 214, 215, and 217, may be referred to as the contiguous radio domain 214 because the domain 214 is the domain with which the other domains overlap. This naming convention should enable one to refer to any specific contiguous radio domain with a unique reference numeral.

Wireless switches that lie in a contiguous radio domain may be referred to as "contiguous" wireless switches. For instance, in the example of FIG. 2, the wireless switches 201, 204, 205, and 207 may be referred to as contiguous radio switches because they lie in a contiguous radio domain. Contiguous wireless switches may write to, read from, or otherwise access station and radio-frequency (RF) data in a shared database. Contiguous wireless switches do not usually include all of the wireless switches in the wireless network; only the switches in the contiguous radio domain share information with each other.

Any single switch may be a member of more than one contiguous radio domain and therefore may share information with other switches that belong to more than one contiguous radio domain. For instance, in the example of FIG. 2, the wireless switch 205 is in a contiguous radio domain 215 that includes wireless switches 202, 204, 206, and 208. However, the wireless switch 205 is also in a contiguous radio domain 214 that includes wireless switches 201, 204, and 207.

As is illustrated by the dashed arrow in FIG. 2, the station 220 will pass through the system 200. Notably, the station 220 always roams to a contiguous switch. Thus, the station 220 never really leaves a contiguous radio domain. For instance, the station 220 roams from domain 214 to domain 215. Domains 214, 215 are part of a contiguous radio domain (e.g., contiguous radio domain 214 or 215). The station 220 then roams from domain 215 to domain 218. Domains 215, 218 are also part of a contiguous radio domain (e.g., contiguous radio domain 215 or 218). And so forth.

Figure 3:
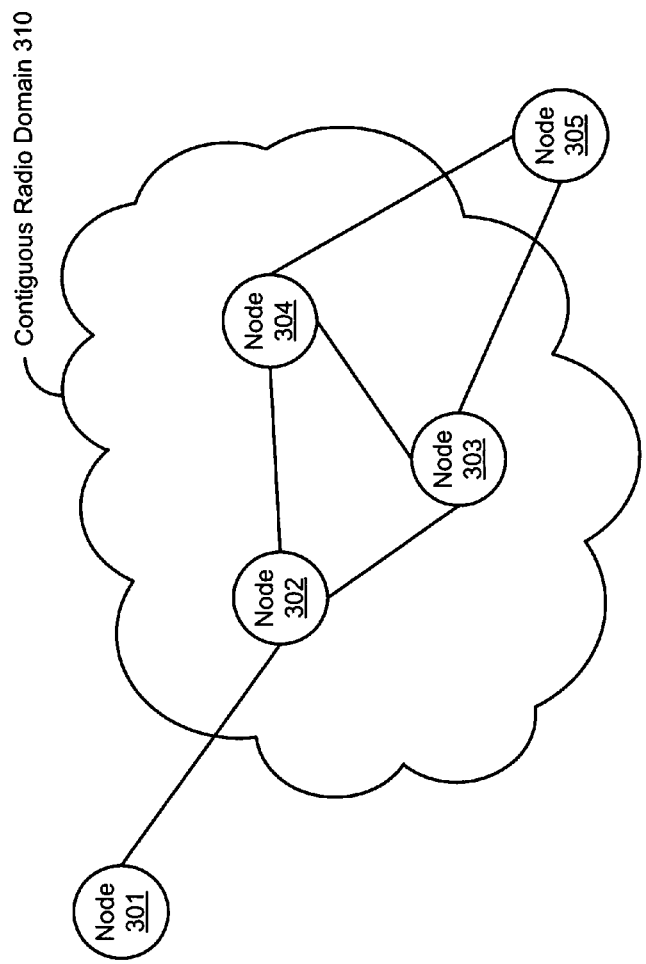
FIG. 3 depicts an example of a connected graph where nodes represent APs and edges represent the property that the APs connected by the edge can currently hear each other through their radios.

FIG. 3 depicts an example of a connected graph 300 where nodes represent APs and edges represent the property that the APs connected by the edge can currently hear (or equivalently, currently receive and understand, an RF transmission from) each other through their radios. Where the graph is not connected, the nodes should not be considered as part of the same contiguous radio domain. It may be appreciated that owing at least to possible changing radio propagation parameters, the contiguous radio domain and its representation as a graph may change dynamically over time.

In the example of FIG. 3, the connected graph 300 includes nodes 301, 302, 303, 304, and 305, and a contiguous radio domain 310. Notably, the contiguous radio domain 310 includes nodes 302, 303, 304, which are connected to one another, but not 301, 305, which are connected to only one or two of the nodes 302, 303, 304.

Figure 4:
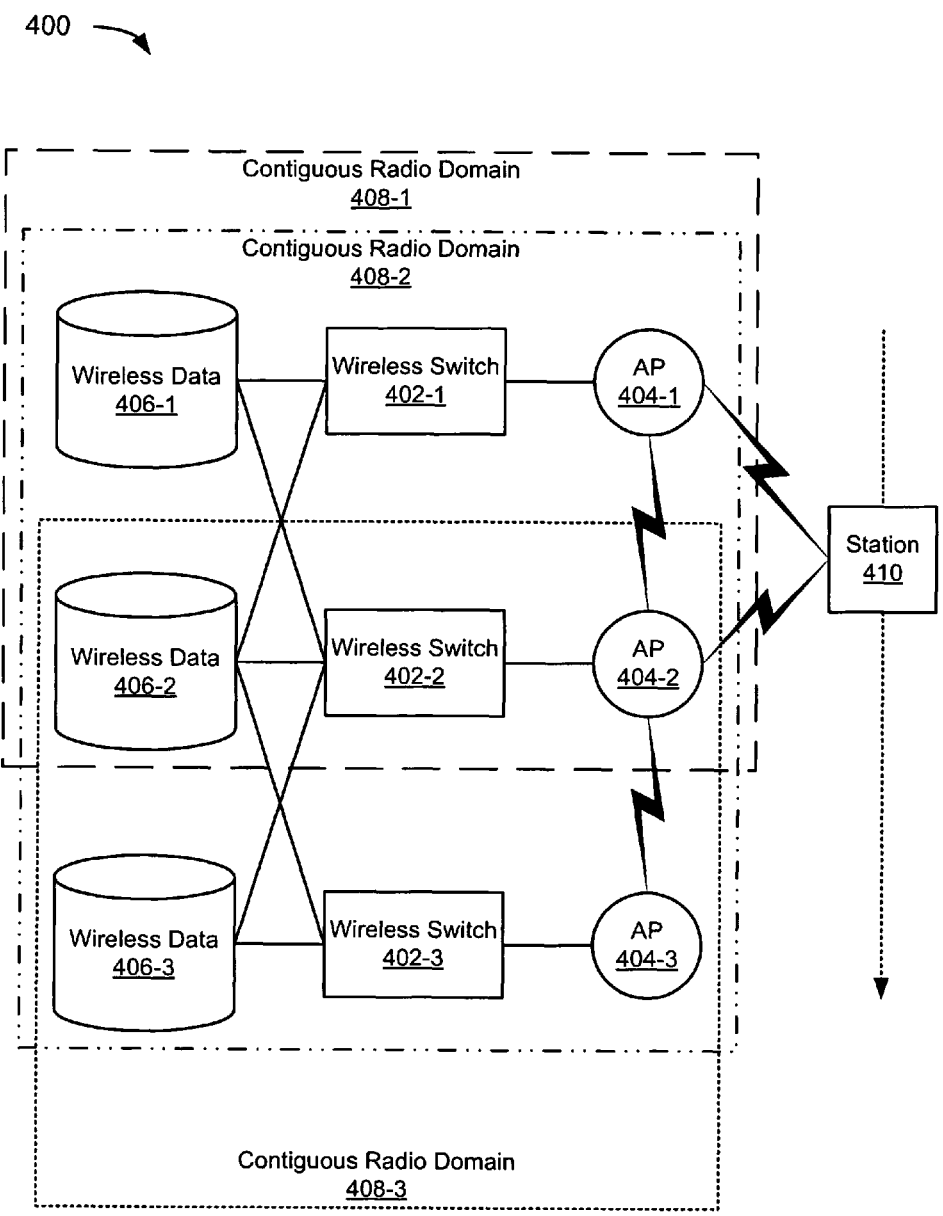
FIG. 4 depicts an example of a system with multiple contiguous radio domains and respective wireless data databases.

FIG. 4 depicts an example of a system 400 with multiple contiguous radio domains and respective wireless data databases. In the example of FIG. 4, the system 400 includes wireless switches 402-1 to 402-3 (referred to collectively as wireless switches 402), APs 404-1 to 404-3 (referred to collectively as APs 404), wireless data databases 406-1 to 406-3 (referred to collectively as the wireless data databases 406), and a station 410. The wireless data databases 406 are associated with respective contiguous radio domains.

The wireless switch 402-1 is coupled to the wireless data database 406-1 and the AP 404-1. In addition, because the wireless switch 402-1 is contiguous with the wireless switch 402-2, the AP 404-1 is in range of the AP 404-2. Also, for the same reason, the wireless switch 402-1 is coupled to the wireless data database 406-2.

The wireless switch 402-2 is coupled to the wireless data database 406-2 and the AP 404-2. In addition, because the wireless switch 402-2 is contiguous with the wireless switch 402-3, the AP 404-2 is in range of the AP 404-3. Also, for the same reason, the wireless switch 402-2 is coupled to the wireless data database 406-3 (and to the wireless data database 406-1).

The wireless switch 402-3 is coupled to the wireless data database 406-3 and the AP 404-3. In addition, because the wireless switch 402-3 is contiguous with the wireless switch 402-2, the wireless switch 402-3 is coupled to the wireless data database 406-2.

In the example of FIG. 4, for illustrative purposes, it is assumed that the wireless switch 402-1 and the wireless switch 402-3 are not contiguous. Under these circumstances, the AP 404-1 and the AP 404-3 cannot hear one another and the wireless switches 402-1, 402-3 do not have radio adjacency.

The wireless data databases 406 include data for their associated contiguous radio domain. The data may or may not be redundantly stored. For example, the wireless data database 406-1 includes data associated with a first contiguous radio domain that includes the wireless switch 402-2. However, the wireless data database 406-2 includes data associated with a second contiguous radio domain that also includes the wireless switch 402-2. Accordingly, the data associated with the wireless switch 402-2 could be redundantly stored. Alternatively, the data associated with the wireless switch 402-2 could be stored in relation to the wireless switch 402-2 itself. In this alternative, the wireless data databases 406 may be thought of as distributed databases that include data stored locally with respect to the relevant wireless switches 402.

The wireless data databases 406 includes wireless data such as, by way of example but not limitation, station record and RF information. In an embodiment, the station record and RF information are stored in RAM, as opposed to non-volatile storage, to facilitate rapid access to the data. However, the wireless data databases 406 may include any known or convenient memory having sufficient speed for a particular implementation.

The station record information may include identification of the station and the station's association with APs 404 (or other APs). The RF information may include what each AP can hear on the RF, e.g. known APs, unknown APs, any other stations, and the like. Advantageously, in the example of FIG. 4, no central configuration, server, or database is required, because the switches 402 maintain associations directly with other switches based on AP radio adjacency, independent of any central configuration.

In an embodiment, the station RF information is either added and immediately distributed to all members of the contiguous radio domain or stored locally and then accessed via broadcast queries. As the number of switches in the contiguous radio domain grows, the process of adding information to the database and distributing it or performing broadcast queries grows.

When conventional techniques are applied, with respect to any one switch, the data-processing and communication with other switches grows linearly as N−1, since for each added switch must store data or information for every other switch and communicate with every other switch. Advantageously, at some point, adding additional APs to a contiguous radio domain becomes redundant (since all APs of the radio domain can hear one another). In other words, the techniques described herein are effective to keep N small. More specifically, C is typically less than 10 in an arbitrarily large global radio domain, where C is the average number of switches in a contiguous radio domain. So, computational complexity of a network that incorporates techniques described herein scales to a constant C (probably less than 10), while prior art networks scale to O(N). In large networks N can be an order of magnitude or more larger than C.

When conventional techniques are applied, for the set of all switches, the network cost grows non-linearly as N×(N−1) or approximately $N^2$ for large N (i.e., the number of connections grows at $O(N^2)$). For large N, this can become unmanageable at arbitrarily large N. Advantageously, using techniques described herein, the number of connections scales to a constant $O(C^2)$, which makes an arbitrarily large global radio domain manageable.

As an aid to understand the potential scalability problem, if each of a number of N switches in a wireless network consisting (or at least including) of N total switches needs to communicates with the other N−1 switches, then the non-linear growth is on the order of N(N−1) or approximately $N^2$ for N being other than a small number. For very large collection of N switches, this can be a scaling problem, in terms of the size of the database, network cost, and latency. For example, if N is one-hundred switches then $N^2=10000$, and if N=1000 switches then $N^2=1,000,000$. These numbers of switches and more are already contemplated for current and near-term future configurations. In a wireless network environment that might span an entire research campus, university, industrial facility, or even a small town or major metropolitan area, wireless networks having tens or thousands of switches may be contemplated, and were conventional technology to be utilized, the overhead and administrative burden of managing the information for the network as well as the memory requirements of each switch or other device storing the database might be prohibitive.

The increased size of a database may affect, and for large number of switches and/or stations will affect, the requirement of memory size or other physical device size. Any increase in physical memory requirements will also cause an increased cost of the device incorporating the larger memory. If the distribution of the database information needs more resources such as time and RF bandwidth, the network cost of the bandwidth utilization increases. Also, if the latency involved in receiving the database increases, it affect the network efficiency and performance. For networks supporting mobile stations that are physically moving into, out of, or between different physical locations within the network, the lack of scalability of conventional systems and methods may break down to the point that the conventional system and method are incapable of supporting changes within the network.

Advantageously, the wireless data databases 406 share only a subset of the wireless data of a global radio domain. The information a wireless switch needs to make RF environmental decisions comes from switches with which it shares an AP radio adjacency. For a very large global radio domain, this can result in a significant reduction in the amount of data that a switch needs to share.

For example, even for an arbitrarily large number N of total switches in a wireless network, the number of switches having adjacent access points might be some number between about two AP's and about ten AP's, though these numbers do not represent limitations. Thus, the physical device requirements such as memory are reduced to tolerable numbers and the communications are likewise reduced as compared to a conventional system and method where the increases are on the order of $N^2$.

The reduction in turn may help to mitigate the scaling problem mentioned above, in terms of network cost, switch cost, and network latency. Also, by reducing processing time of unnecessary data content, it may help the station 410 to roam seamlessly in the wireless network, as compared to a conventional network implementation where for a large number of switches, the same station may not be able to roam seamlessly because the physical movement might outpace the ability of the system to track or maintain communication with the station.

In the example of FIG. 4, in operation, the AP 404-1 listens for other APs on the network and hears the AP 404-2. The findings are reported back to the wireless switch 402-1. Listening may include operating in a receive signal mode where an AP attempts to detect RF signal transmissions from other access points or stations. Typically, the AP will be understood to hear other AP's when it listens if the signal strengths of received signals are of sufficient strength (and with sufficient signal-to-noise ratio) to provide usable signal. The switch 402-1 knows of the existence of all other switches in the contiguous radio domain and their associated AP's (e.g., wireless switch 402-2, AP 404-2). This data may be stored in the appropriate one or more of the wireless data databases 406.

The wireless switches 402 do not automatically share RF and session information until they've established an AP adjacency. Once an AP adjacency is discovered by a specific switch and if the AP adjacency discovered is associated with a contiguous switch, the specific switch initiates a session with the switch having AP adjacency, and all RF and station information is now shared between the two switches. So long as an AP adjacency exists between the two switches, the switches share data, which is represented by the coupling of wireless switches to the wireless data databases of contiguous switches in the example of FIG. 4.

If over time, AP adjacency changes, the sharing of data between the two (or more) switches may also change. By way of example, if two switches had an AP adjacency at time t1 and that AP adjacency later disappeared at time t2 (perhaps because of marginal signal strength), then the two switches do not share the station RF database anymore and the lost AP adjacency information is updated. Therefore, in an embodiment, the ability to currently receive RF signals transmitted by the other AP owned by another switch is a dynamic ability that may change over time and may be a function of the location of a station relative to an AP radio.

The station 410 is, for illustrative purposes, within RF range of the APs 404-1 and 404-2. The dotted arrow represents the direction the station 410 will roam in this example. The station 410 may be any IEEE 802.11 entity or the equivalent in other related standards. Although the station 410 roams in this example, it could alternatively be stationary.

Initially, the station 410 is assumed to have been associated at AP 404-1 in the contiguous radio domain 408-1. As shown in the example of FIG. 4, the station is within range of the APs 404-1, 404-2. Thus, the station 410 is in either the contiguous radio domain 408-1 or the contiguous radio domain 408-2 (because the station is within range of the APs 404-1, 404-2, both of which are in the contiguous radio domain 408-1 and the contiguous radio domain 408-2). In an embodiment, actually deciding which of the contiguous radio domains to which the station 410 belongs is not necessary, since the data that is needed is available to both the wireless switch 402-1 and the wireless switch 402-2. Thus, if the station 410 changes associations from AP 404-1 to AP 404-2, the handoff is smooth (because the wireless switch 402-2 has access to all of the data it needs).

Later, the station 410 may roam to near the AP 404-3. At this point, the station is presumably no longer in range of the AP 404-1. However, the switch 402-1 does not need data associated with the station 410 because the station is now out of range. In addition, the switch 402-3 has access to the data known to wireless data database 406-2 (since it is in a contiguous radio domain). So the handoff of the station 410, if one occurs, will also be smooth.

Figure 5:
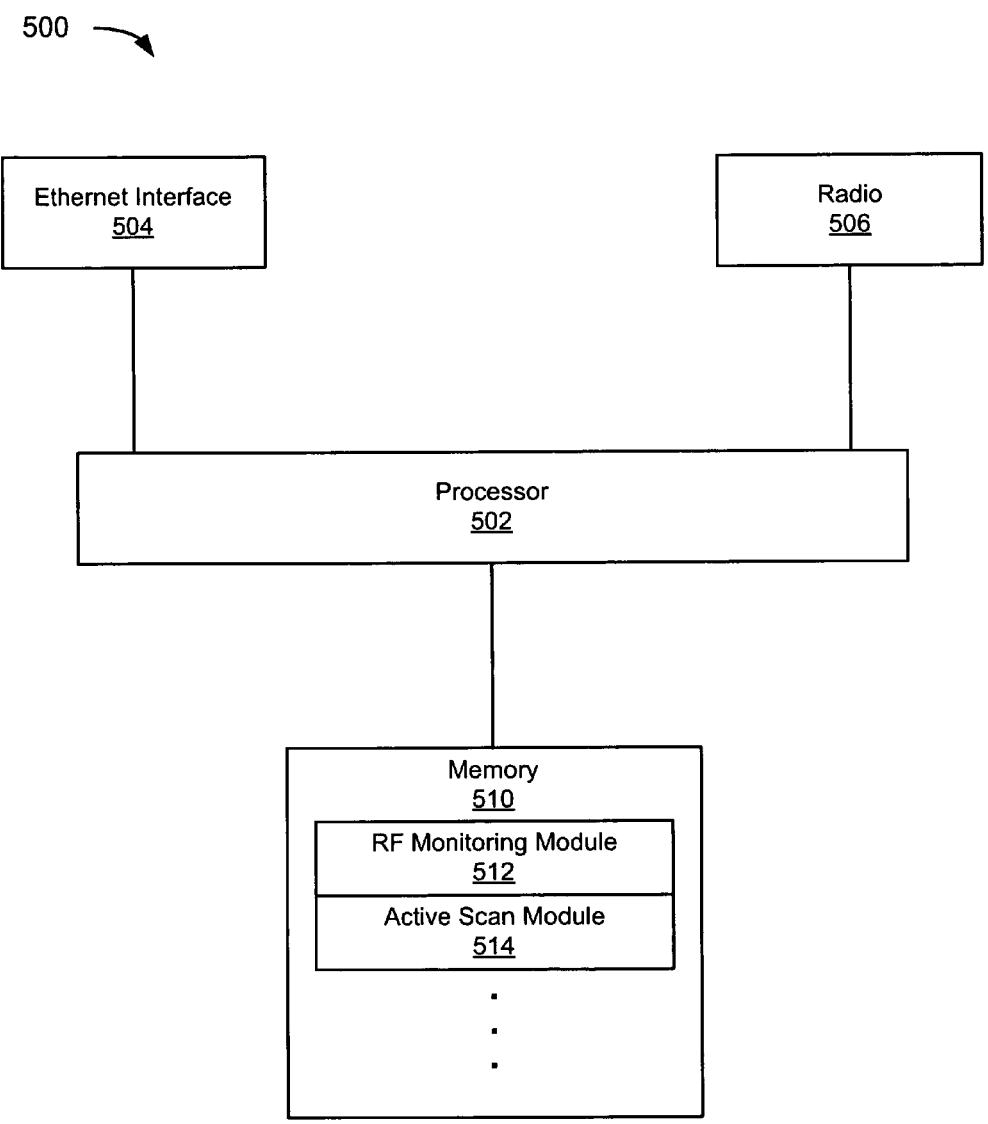
FIG. 5 depicts an example of an AP.

FIG. 5 depicts an example of an AP 500. In the example of FIG. 5, the AP 500 includes a processor 502 that is coupled to an Ethernet interface 504, a radio 506, and memory 510. The memory includes an RF monitoring module 512 and an active scan module 514. The RF monitoring module 512 monitors the air and the active scan module 514 probes RF channels for other APs on different RF channels. The active scan module 514 may be turned off when, for example, its operation reduces performance of a specific application.

Figure 6:
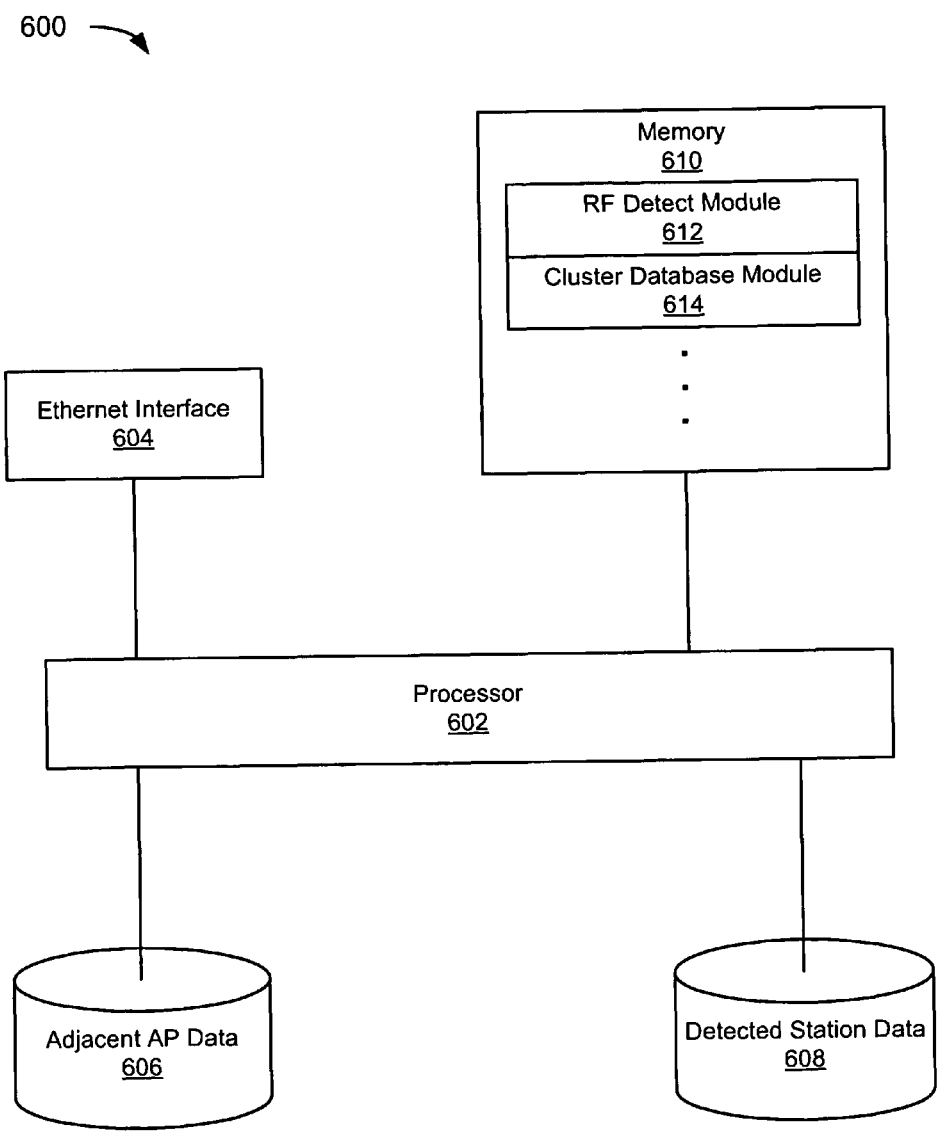
FIG. 6 depicts an example of a wireless switch.

FIG. 6 depicts an example of a wireless switch 600. In the example of FIG. 6, the wireless switch 600 includes a processor 602, an Ethernet interface 604, an adjacent AP data database 606, a detected station data database 608, and memory 610. The Ethernet interface 604 may be used to provide a communication path between the switch 600 and an AP (e.g., the AP 500 of FIG. 5). The adjacent AP data database 606 and the detected station data database 608 may be implemented in RAM or some other sufficiently fast known or convenient memory. The memory 610 includes an RF detect module 612, which may include RF data, and a cluster database module 614. In an embodiment, the memory 610 includes the adjacent AP data database 606 and the detected station data database 608.

In the example of FIG. 6, in an embodiment, the RF detect module 612 sends commands through the Ethernet interface 604 to an AP (not shown). The AP provides data related to anything that it finds. Data related to other APs can be stored in the adjacent AP data database 606, while data related to stations may be stored in the detected station data database 608. Notably, all switches on the wireless network are known to all of the other switches. This data is stored in a cluster database (not shown). The cluster database includes data about AP ownership. The switch 600 can access the data using the cluster database module 614.

Depending upon the wireless technology, all APs may be stations. However, since data associated with each of the stations of the wireless network is stored in a cluster database, the cluster database module 614 can distinguish between APs and clients (and, for example, rogue APs, as well). So data stored in the adjacent AP data database 606 can be limited to that of APs coupled to switches on the wireless network. Thus, when the RF detect module 612 detects a station, the data associated with the station will be stored in the adjacent AP data database 606 or the detected station data database 608 as appropriate. (Other wireless data may also be stored, but that is omitted for the purpose of this example.)

Figure 7:
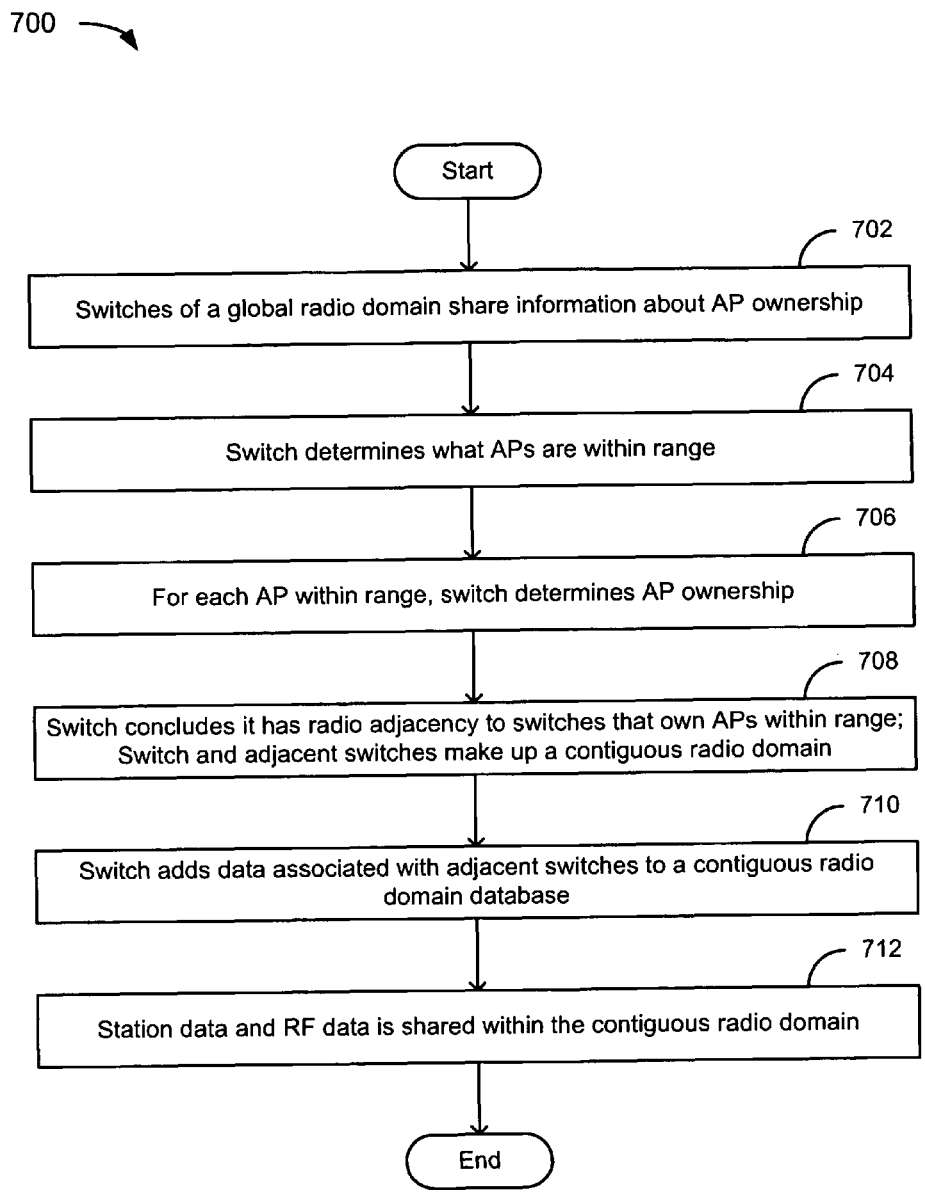
FIG. 7 depicts a flowchart of an example of a method for maintaining a scalable dynamic station RF database.

FIG. 7 depicts a flowchart 700 of an example of a method for maintaining a scalable dynamic station RF database. In the example of FIG. 7, the flowchart 700 starts at module 702 where switches of a global radio domain share information about AP ownership. The AP ownership (and other data) may be stored in, for example, a cluster database.

In the example of FIG. 7, the flowchart 700 continues to module 704 where a switch determines what APs are within range. A switch may determine that APs are in range if at least one AP that is coupled to the switch detects the AP. For the purpose of this description, it is assumed that even if only one AP associated with a switch detects another AP, the detected AP is adjacent. However, it may be desirable to include a threshold determination (e.g., a "strong adjacency threshold") that requires more in order for a switch to be treated as contiguous.

In the example of FIG. 7, the flowchart 700 continues to module 706 where, for each AP within range, the switch determines AP ownership. AP ownership may be determined by, for example, consulting a cluster database. Notably, rogue APs can be identified with this determination (and appropriate countermeasures taken).

In the example of FIG. 7, the flowchart 700 continues to module 708 where the switch concludes it has radio adjacency to switches that own APs within range; the switch and the adjacent switches make up a contiguous radio domain. It may be noted that the switch may "conclude" it has radio adjacency without taking any affirmative steps. Thus, module 708 may or may not be a no-op.

In the example of FIG. 7, the flowchart 700 continues to module 710 where the switch adds data associated with adjacent switches to a contiguous radio domain database. The contiguous radio domain database may or may not be local with respect to the switch.

In the example of FIG. 7, the flowchart 700 continues to module 712 where station data and RF data is shared within the contiguous radio domain. For example, as a station roams from an AP of a first switch to an AP of a second switch, where the first and second switch are part of the contiguous radio domain, the second switch has access to the station data and RF data. Thus, the transition between the first and second switch is smooth (e.g., the data does not have to "catch up" with" the station as it roams).

Advantageously, as the station roams, the records need only be propagated within the subset of the domains that are adjacent to one another. This enables wireless networks to scale arbitrarily large.

Figure 8:
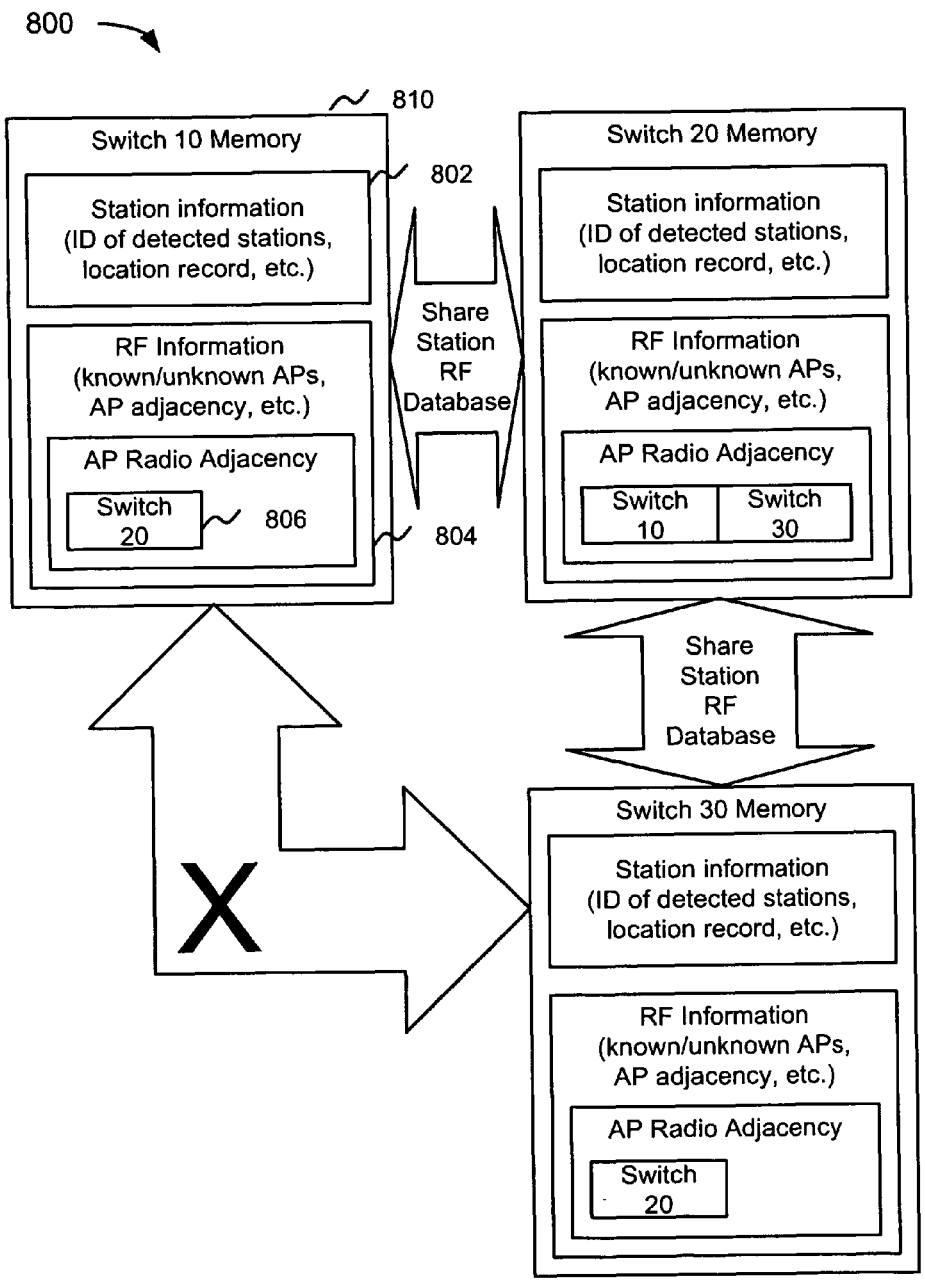
FIG. 8 depicts an example of a diagrammatic illustration showing station radio-frequency (RF) database sharing.

FIG. 8 depicts an example of a diagrammatic illustration 800 showing station radio-frequency (RF) database sharing. The example of FIG. 8 shows at least one embodiment of the sharing scheme of the station RF database. The RF information should include all known and unknown stations, not just APs, which are a special kind of station. Various embodiments may provide for a local database defined within a storage media of each switch, such as a RAM memory 800, as well as for a data base that is distributed between and among a plurality of switches.

The data or information stored within each switch may generally differ from switch to switch, and the organization or structure of data or information in each switch may or may not be the same. Persistent memory may be used for storage if there is a desirability to maintain the most recent memory contents in the event of a power down or power off situation, however such persistent memory is not required because in at least one non-limiting embodiment, the information is newly gathered when a switch is powered up or reinitiated.

The database or data structure includes a first storage (such as a first field or register) for storing a station information 802 and a second storage (such as for example a second field or register or record) for storing an RF information 804 for each switch. In another embodiment, a common storage (such as a common field or register or record) may store both the station information 802 and the RF information 804. In one embodiment, the station information 802 may include an identification of any detected stations and location record; and, the RF information 804 may include an access-point (AP) information of known APs, unknown APs, and AP radio adjacency 806, where the adjacency may be determined by whether an AP owned by a specific switch can receive RF signals transmitted by the other AP owned by another switch.

Since switch 10 shares a radio adjacency with switch 20, they share the station RF database. Also, since switch 20 shares a radio adjacency with switch 30, they share the station RF database. However, switch 30 and switch 10 do not share a radio adjacency and therefore do not include each others' information. So, the station information and RF information on switch 10 include what it learns from its APs plus what switch 20 has learned from its APs. Switch 20 DB includes switch 20's, switch 10's and switch 30's information. Switch 30 includes switch 30's and switch 20's. Switch 10 does not include switch 30's and switch 30 does not include switch 10's. Advantageously, the amount of information stored on switch 10 and switch 30 is then half of what it would be without using the techniques described herein.

As used herein, the term "embodiment" means an embodiment that serves to illustrate by way of example but not limitation. It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system, comprising:
a first wireless switch configured to be coupled to (1) a first access point wirelessly coupled to a wireless station, (2) a second wireless switch that is coupled to a second access point; the second access point having radio adjacency with the first access point when the first access point detects a second access point, and (3) a third wireless switch coupled to a third access point; the third access point not having radio adjacency with the first access point when the first access point does not detect the third access point;
the first wireless switch configured to be coupled to a first contiguous radio domain database including wireless data associated with the first wireless switch that includes radio frequency (RF) information including access point radio adjacency information associated with the first access point;
the first wireless switch configured to be coupled to a second contiguous radio domain database (1) including the wireless data associated with the first wireless switch, (2) including wireless data associated with the second wireless switch based on the second access point having radio adjacency with the first access point, the wireless data associated with the second wireless switch includes RF information including access point radio adjacency information associated with the second access point, and (3) not including wireless data associated with the third wireless switch based on the third access point not having radio adjacency with the first access point, the second wireless switch configured to be coupled to the first contiguous radio domain database, the second contiguous radio domain database, and a third contiguous radio domain database, the third contiguous radio domain database including wireless data associated with the third wireless switch based on the second access point having radio adjacency with the third access point.

2. The system of claim 1, wherein the first wireless switch is configured to be coupled to the first access point including a module monitoring a radio frequency to establish radio adjacency.

3. The system of claim 1, wherein the first contiguous radio domain database is distributed among the first wireless switch, the second wireless switch and the third wireless switch.

4. The system of claim 1, wherein the wireless data associated with the first wireless switch includes radio adjacency information associated with the first access point.

5. A method comprising:
storing, in a first contiguous radio domain database, wireless data associated with a first wireless switch that includes radio frequency (RF) information including access point radio adjacency information associated with a first access point wirelessly coupled to a wireless station, the first wireless switch coupled to (1) the first access point and the first contiguous radio domain database (2) a second wireless switch that is associated with a second contiguous radio domain databased and that is coupled to a second access point; the second access point having radio adjacency with the first access point when the first access point detects the second access point, and (3) a third wireless switch that is associated with a third contiguous radio domain databased and that is coupled to a third access point; the third access point not having radio adjacency with the first access point when the first access point does not detect the third access point;
receiving, at the first contiguous radio domain database, wireless data associated with the second wireless switch that includes radio frequency information including access point radio adjacency information associated with the second access point;
storing, in the first contiguous radio domain database, the wireless data associated with the second wireless switch based on the second access point having radio adjacency with the first access point, and not wireless data associated with the third wireless switch based on the third access point not having radio adjacency with the first access point; and
storing, in the third contiguous radio domain database, the wireless data associated with the second wireless switch based on the second access point having radio adjacency with the third access point, and not wireless data associated with the first wireless switch based on the third access point not having radio adjacency with the first access point.

6. The method of claim 5, further comprising:
detecting a station; and storing, in the first contiguous radio domain database, data associated with the station.

7. An apparatus, comprising:
a first storage media including a memory storing a first contiguous radio domain database portion associated with a first wireless switch being coupled to a second wireless switch and to a third wireless switch;
the first contiguous radio domain database portion (1) including wireless data associated with the first wireless switch that includes the radio frequency (RF) information including access point radio adjacency information associated with a first access point (2) including, based on the first access point coupled to the first wireless switch; the first access point is wirelessly coupled to a wireless station and has radio adjacency with a second access point coupled to the second switch when the first access point detects the second access point, wireless data associated with the second switch that includes RF information including radio adjacency information associated with the second access point, and (3) not including, based on the first access point coupled to the first wireless switch; the first access point not having radio adjacency with a third access point coupled to the third wireless switch when the first access point does not detect the third access point, wireless data associated with the third wireless switch that includes RF information associated with the third access point, a second storage media including a memory storing a second contiguous radio domain database portion associated with the second wireless switch that is coupled to the first wireless switch, to the second wireless switch, and to the third wireless switch.

8. The apparatus as in claim 7, wherein the storage media comprises a solid state memory.

9. The apparatus as in claim 7, the first contiguous radio domain database portion associated with a database that includes (1) the first contiguous radio domain database portion, (2) the second contiguous radio domain database portion located at the second switch, and (3) a third contiguous radio domain database portion located at the third switch.

10. An apparatus, comprising:
a first wireless switch configured to be coupled to (1) a first access point wirelessly coupled to a wireless station, (2) a second wireless switch coupled to a second access point; the second access point having radio adjacency with the first access point when the first access point detects the second access point, and (3) a third wireless station coupled to a third access point; the third access point not having radio adjacency with the first access point when the first access point does not detect the third access point,
the first wireless switch configured to include a memory storing a first contiguous radio domain database including station information and radio frequency (RF) information including radio adjacency information associated with the first access point and the second access point, the second wireless switch configured to include a memory storing a second contiguous radio domain database including station information and RF information including radio adjacency information associated with the first access point, the second access point, and the third access point,
the first wireless switch configured to include a processor to update the first contiguous radio domain database with the station information and the RF information of the second wireless switch based on the second access point having radio adjacency with the first access point but not update the first contiguous radio domain database with the station information and RF information of the third wireless switch based on the third access point not having radio adjacency with the first access point.

11. The apparatus of claim 10, wherein the first contiguous radio domain database includes a first field associated with the station information and a second field associated with the RF information including radio adjacency information associated with the first access point and the second access point; the station information including identification of any detected stations and location record; the RF information including radio adjacency information associated with the first access point and the second access point further including an access-point information of a known access point, an unknown access point, and an access point radio adjacency, the adjacency being determined by whether an access point owned by the wireless switch can receive RF signals transmitted by the other access point owned by another switch.

* * * * *